United States Patent
Dudek

(10) Patent No.: US 7,448,357 B2
(45) Date of Patent: Nov. 11, 2008

(54) AIR INDUCTION SYSTEM AND ASSEMBLY METHOD FOR AN INTAKE MANIFOLD WITH A SINGLE SHAFT AND SENSOR FOR ACTIVATING AIR CONTROL VALVES

(75) Inventor: Kenneth D. Dudek, Royal Oak, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/926,466

(22) Filed: Oct. 29, 2007

(65) Prior Publication Data

US 2008/0141970 A1   Jun. 19, 2008

Related U.S. Application Data

(62) Division of application No. 11/609,918, filed on Dec. 13, 2006, now Pat. No. 7,302,930.

(51) Int. Cl.
*F02D 9/10* (2006.01)
(52) U.S. Cl. ............. 123/336; 123/184.21; 123/184.48; 123/184.56; 123/337; 251/251
(58) Field of Classification Search ............ 123/184.21, 123/184.48, 184.56, 336, 337; 251/251
See application file for complete search history.

(56) References Cited

U.S. PATENT DOCUMENTS

| | | | |
|---|---|---|---|
| 2,315,775 A | 4/1943 | D Arcey | |
| 2,883,144 A | 4/1959 | Kendig | |
| 3,264,949 A | 8/1966 | Dietlin | |
| 3,319,925 A | 5/1967 | Kojima et al. | |
| 4,210,107 A | 7/1980 | Shaffer | |
| 4,274,368 A | 6/1981 | Shaffer | |
| 4,504,038 A | 3/1985 | King | |
| 4,651,969 A | 3/1987 | Dowdall | |
| 4,805,573 A | 2/1989 | Macfarlane et al. | |
| 4,977,866 A | 12/1990 | Wilkins | |
| 5,010,862 A | 4/1991 | Hashimoto et al. | |
| 5,103,867 A | 4/1992 | Wu | |
| 5,211,139 A | 5/1993 | Houle et al. | |
| 5,255,649 A | 10/1993 | Isaka | |
| 5,596,966 A | 1/1997 | Elder | |
| 5,671,712 A | 9/1997 | Uchida | |
| 5,803,045 A | 9/1998 | Adamisin et al. | |
| 5,979,401 A | 11/1999 | Hickey | |
| 6,039,029 A | 3/2000 | Nagasaka et al. | |
| 6,244,228 B1 | 6/2001 | Kuhn et al. | |
| 6,793,194 B1 | 9/2004 | Grinberg | |
| 2004/0173172 A1 | 9/2004 | Harada et al. | |

*Primary Examiner*—Stephen K Cronin
*Assistant Examiner*—J. Page Hufty
(74) *Attorney, Agent, or Firm*—Ralph E. Smith

(57) ABSTRACT

The present invention utilizes a single shaft with cam-actuated control valves and one linear solenoid for control of air flow control vales in the air induction system for a V-type engine. According to various exemplary embodiments of the present invention, the single shaft and one sensor are utilized to activate all control valves. Additionally, the present invention can also be used in in-line engines. Advantageously, the present invention utilizes one moving shaft and sensor to activate all control valves on both sides of the intake manifold without restricting air flow by locating the shaft in the middle of the manifold—lower housing. Further, the control valves are not attached with screws, thus eliminating a tolerance stack-up at assembly problem. The air induction sub-system can be manufactured with metals or plastic, or any combination thereof.

3 Claims, 12 Drawing Sheets

AIR INDUCTION SYSTEM AND ASSEMBLY METHOD FOR AN INTAKE MANIFOLD WITH A SINGLE SHAFT AND SENSOR FOR ACTIVATING AIR CONTROL VALVES

CROSS-REFERENCE TO RELATED APPLICATION

This application is a Divisional of U.S. patent application Ser. No. 11/609,918, filed Dec. 13, 2006 now U.S. Pat. No. 7,302,903.

FIELD OF THE INVENTION

The present invention relates generally to an air induction system for an internal combustion engine and more particularly to a subsystem including intake air flow valves in the engine intake manifold system with one shaft and one sensor to activate all valves.

BACKGROUND OF THE INVENTION

In internal combustion engines, air is mixed with fuel in one or more combustion chambers. Engine intake manifolds supply the air/fuel mixture to the combustion chambers. Engine intake manifolds also perform air induction to provide a constant and steady air flow to the combustion chambers. Air flow control valves in the intake manifold are used to create air tumble and swirl to achieve a better burn of air when mixed with fuel in the combustion chambers. Advantageously, air tumble and swirl reduces fuel consumption by optimizing the air/fuel mixture in the combustion chambers, lowers the level of emissions, and provides better engine performance. In operation, air flow control valves are configured to restrict and allow air flow through intake manifold ports, thus creating additional air tumble and swirl during intake of the air/fuel mixture in the combustion chambers. This air tumble provides an improved combustion rate at low revolutions per minute (RPM) through a better burn of the air/fuel mixture in the catalytic converter.

Traditionally, the intake manifolds require two rotating shafts with a linkage and driver, or two drivers with additional position sensors for actuating the air flow control valves. Additionally, most current designs locate the shafts in the middle of the intake ports, thus creating a restriction of air flow that impacts performance at high RPM. Existing systems utilizing a center shaft to operate valves for both sides of the intake manifold utilize gear and linkages. Disadvantageously, these systems suffer performance degradation due to slop between gears, are complex to assemble, and can suffer from the bending of the linkage arms.

Systems and an associated assembly method are thus needed for a single shaft to operate air flow control valves for both sides of an intake manifold in a 'V' type engine without gears and linkages.

BRIEF SUMMARY OF THE INVENTION

The present invention utilizes a single shaft with cam-actuated control valves and one linear solenoid for control of the air flow control vales in the air induction system for a V-type engine. According to various exemplary embodiments of the present invention, the single shaft and one sensor are utilized to activate all control valves (e.g., six control valves for a V6 engine, eight control valves for a V8 engine, etc.). Additionally, the present invention can also be used in in-line engines.

The single shaft includes a fixed tube shaft with a moveable center shaft disposed inside the tube shaft. The tube shaft includes open grooves through which small dowel pins are inserted into the moveable center shaft. The control valves include an opening in their base into which the tube shaft slides. The base opening of the control valves includes an angled cam groove through which the dowel pins fits. The dowel pins are attached to the moveable center shaft, and movement of the center shaft engages the dowel pins with the angled cam grooves in the control valve base. The angle of the grooves includes radii at sharp edges to rotate the control valve responsive to the linear center shaft movement.

Advantageously, the present invention utilizes one moving shaft and sensor to activate all control valves on both sides of the intake manifold without restricting air flow by locating the shaft in the middle of a manifold lower housing. Further, the control valves are not attached with screws, thus eliminating a tolerance stack-up at assembly problem. The air induction sub-system can be manufactured with metals or plastics, or any combination thereof. Finally, the same air induction sub-system can be used on any engine such as V-types, in-line, and the like.

In an exemplary embodiment of the present invention, an air induction system of an intake manifold of an internal combustion engine utilizing a single shaft and sensor to activate all air control valves includes a stationary tube shaft comprising a plurality of slot openings; one or more control valves each including a base with an opening and a flap connected to the base, wherein the stationary tube shaft fits within the opening of each of the one or more control valves; a moveable center shaft disposed and configured to move linearly within the stationary tube shaft; and a plurality of dowel pins attached to the moveable center shaft and extending through the plurality of slot openings, wherein linear motion of the moveable center shaft engages the dowel pins in an angled cam groove in the base of each of the one or more control valves to activate the one or more control valves. The angled cam groove includes radii at sharp edges allowing one of the plurality of dowel pins to slide through the angled cam groove to translate linear motion from the moveable center shaft to activate the control valve. Further, the radii at sharp edges are oriented accordingly to translate linear motion from the moveable center shaft to activate the one or more control valves. The moveable center shaft is operable to activate the one or more control valves located on both sides of the intake manifold. The air induction system is utilized in a 'V'-type engine or an in-line engine. The one or more control valves are configured to restrict air flow through an intake port in the intake manifold when the moveable center shaft is in a first position and configured to allow air flow through an intake port in the intake manifold when the moveable center shaft is in a second position. Optionally, the air induction system further includes a motor configured to selectively move the moveable center shaft to a first position to engage all of the one or more control valves and to a second position to disengage all of the one or more control valves, and a position sensor operable to determine the position of the moveable center shaft. The motor includes one of a linear induction motor and a rotating motor with an arm connected to the moveable center shaft, and the sensor includes a Hall Effect sensor. The one or more control valves are not attached with screws, thus eliminating a tolerance stack-up at assembly problem.

In another exemplary embodiment of the present invention, an air induction method utilizing a single shaft and sensor to activate all air control valves includes the steps of selectively moving a moveable center shaft to a first position to engage a plurality of control valves to restrict air flow through intake ports of an intake manifold, and selectively moving the moveable center shaft to a second position to disengage the plurality of control valves to allow air flow through intake ports of the intake manifold; wherein the moveable center shaft is configured to engage an angled cam groove in the base of each of the plurality of control valves with a dowel pin, and wherein the angled cam groove includes radii at sharp edges operable to translate linear motion of the moveable center shaft to engage and disengage the plurality of control valves. The moveable center shaft is configured to engage and disengage the plurality of control valves on both sides of a 'V'-type engine intake manifold.

In yet another exemplary embodiment of the present invention, an assembly method for an air induction system utilizing a single shaft and sensor to activate all air control valves includes the steps of placing a plurality of control valves in ports in a manifold lower housing, threading a tube shaft through an opening in the manifold lower housing and through the bases of the plurality of control valves, threading a moveable center shaft through the center of the tube shaft, moving the tube shaft to expose slot openings of the tube shaft in slot openings of the manifold lower housing, lining up pin holes in the moveable center shaft with the slot openings in the tube shaft, inserting pins in the pin holes in the moveable center shaft, moving the moveable center shaft back to engage a groove in the base of each of the plurality of control valves with the pins, re-positioning tube shaft to line up with holes in the manifold lower housing, and inserting roll pins in the holes in the manifold lower housing.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

The present invention utilizes a single shaft with cam actuated control valves and one linear solenoid for control of the air flow control vales in the air induction system for a V-type engine. According to various exemplary embodiments of the present invention, the single shaft and one sensor are utilized to activate all control valves (e.g., six control valves for a V6 engine, eight control valves for a V8 engine, etc.). Additionally, the present invention can also be used in in-line engines.

The single shaft includes a fixed tube shaft with moveable center shaft inside the tube shaft. The tube shaft is fixed to the manifold lower housing with roll pins. The tube shaft includes open grooves through which small dowel pins are inserted into the moveable center shaft. The control valves include a base opening in which the control valves slide into the tube shaft. The base opening of the control valves includes an angled cam groove through which the dowel pins fit. The dowel pins ate attached to the moveable center shaft, and movement of the center shaft engages the dowel pins with the angled cam grooves in the control valve base. The angle of the grooves includes radii at sharp edges to rotate the control valve responsive to the linear center shaft movement.

For illustration purposes, this disclosure utilizes a V6 engine manifold with the present invention. The present invention can also be used to other V-type engines and in-line engines. Further, the figures illustrate the intake manifold without other components such as combustion, chambers, fuel injection, etc.

Figure 1A:
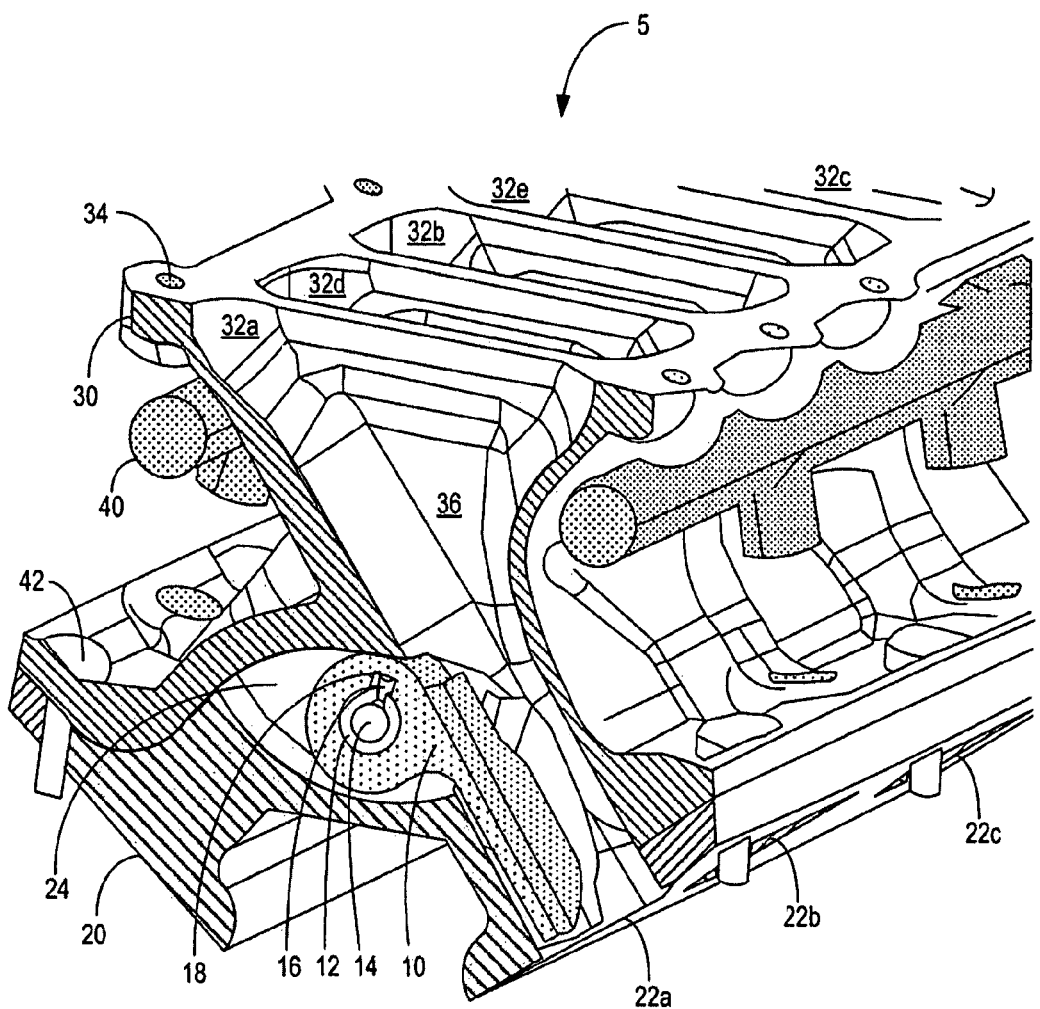
FIGS. 1a-1b illustrate a cross-sectional perspective view and an expanded cross-sectional perspective view of an engine intake manifold with a control valve according to an exemplary embodiment of the present invention.
Figure 1B:
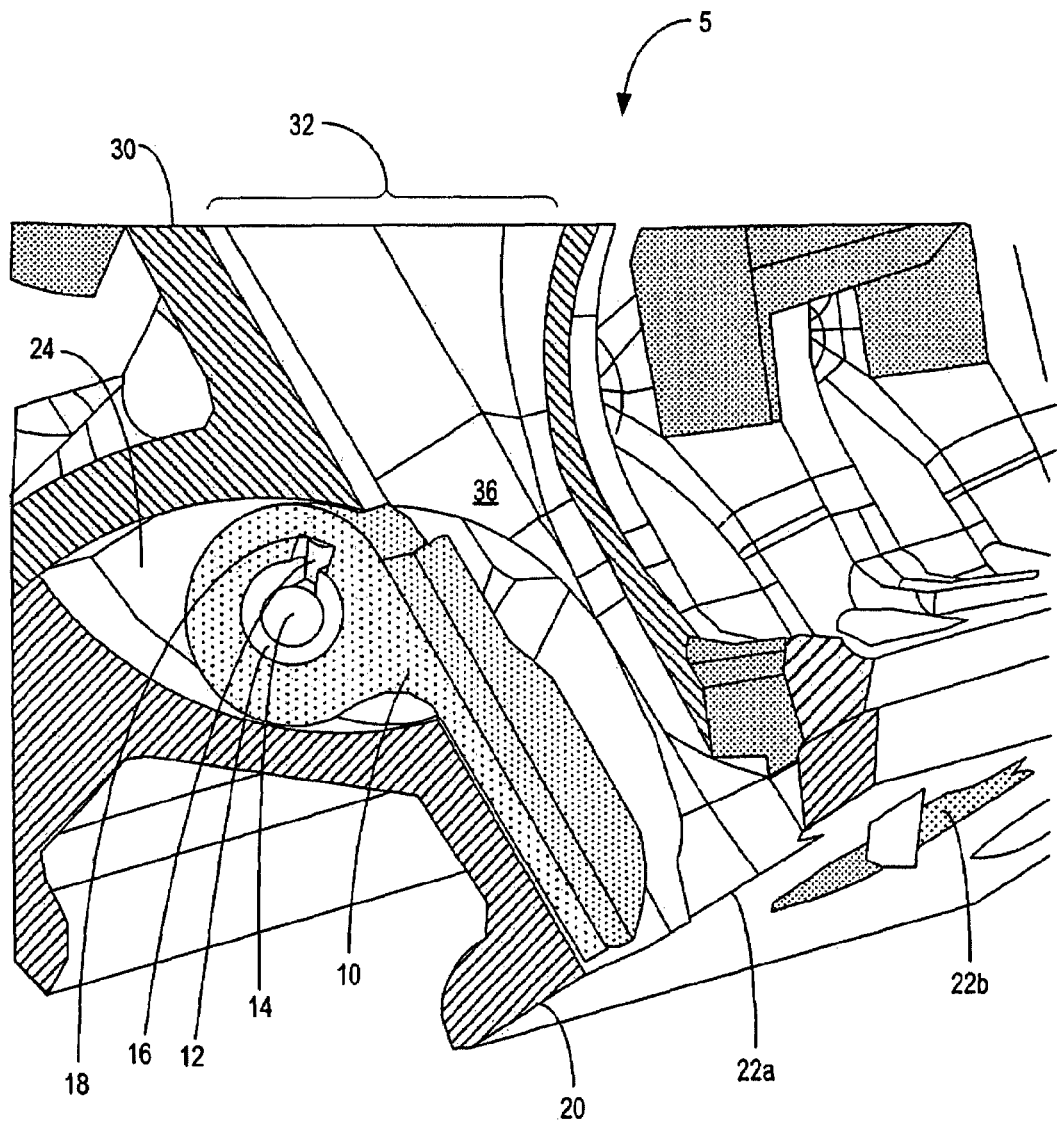

FIGS. 1a-1b illustrate a cross-sectional perspective view and an expanded cross-sectional perspective view of an engine intake manifold 5 with a control valve 10 according to an exemplary embodiment of the present invention. FIG. 1a illustrates the intake manifold 5 showing a cross-section of one port 36, and FIG. 1b illustrates a detailed view of the port 36.

The intake manifold 5 includes a manifold lower housing 20 bolted to a manifold upper housing 30 by multiple bolts 42. The intake manifold 5 includes multiple ports 36 configured to provide an optimized and evenly distributed flow of air to combustion chambers (not shown) which attach to the manifold lower housing 20 at port openings 22a, 22b, and 22c and to port openings on the other side of the manifold lower housing which are not shown. The manifold upper housing 30 includes port openings 32a-32e through which air enters the manifold 5. Air flows from the openings 32a, 32b, and 32c to the ports 22a, 22b, and 22c. Additionally air flows from the openings 32d and 32e to ports located on the other side of the manifold lower housing 20 which are not shown. The manifold upper housing 30 and manifold lower housing 20 each form a portion of the manifold ports 36. Carburetors and throttle bodies are configured to attach to an upper manifold (not shown) which can be mounted to the manifold upper housing 30 through holes 34. Additionally, a fuel rail 40 provides distribution of fuel to the injectors or carburetors.

The control valve 10 is located in a slot 24 which is cut into the manifold lower housing 20. The control valve 10 is configured to restrict and allow air flow through the ports 36 to create air tumble for improved engine combustion stability. Advantageously, the present invention utilizes a single shaft to activate all control valves 10 in tandem, and the single shaft utilizes one range of motion for activating control valves 10 on both sides of the manifold 5.

The base of the control valve 10 includes an angled cam groove 18 and an opening through which a tube shaft 12 fits. The tube shaft 12 is configured to remain fixed to the manifold lower housing 20 via roll pins in holes 52 located in the manifold lower housing 20. The tube shaft 12 includes a moveable center shaft 14 through the tube shaft 12 center. The tube shaft 12 also includes a slot 62 where a dowel pin 16 is inserted into the moveable center shaft 14. The dowel pin 16 is configured to engage and move along the angled cam groove 18 in the control valve 10 responsive to linear motion of the moveable center shaft 14 thereby creating rotating motion to activate the control valve 10. The angled cam groove 18 is cut through the base of the control valve 10 to translate linear motion by the dowel pin 16 into rotational motion in the control valve 10. For example, the angled cam groove 18 can include an angle cut with edges at sharp radii through the circular base of the control valve 10.

Additional ports such as the ports with port openings 32b-32e each include the control valve 10 of the present invention. In the exemplary embodiment of FIG. 1a, the ports with port openings 32d and 32e would have a control valve oriented in the opposite direction as the control valve 10 in port opening 32a. These control valves would have an angled cam groove to create opposite rotational direction from the control valve 10 in port opening 32a.

Advantageously, the present invention utilizes the moveable center shaft 14 with multiple dowel pins 16 to activate all control valves 10. In an exemplary embodiment for a V6 type engine, there are six control valves engaged by six dowel pins attached to the moveable center shaft, and the center shaft is configured to activate all six control valves with linear motion. Further, these control valves are not attached to the center shaft 14 with screws thus eliminating a tolerance stack-up problem during assembly.

Figure 2A:
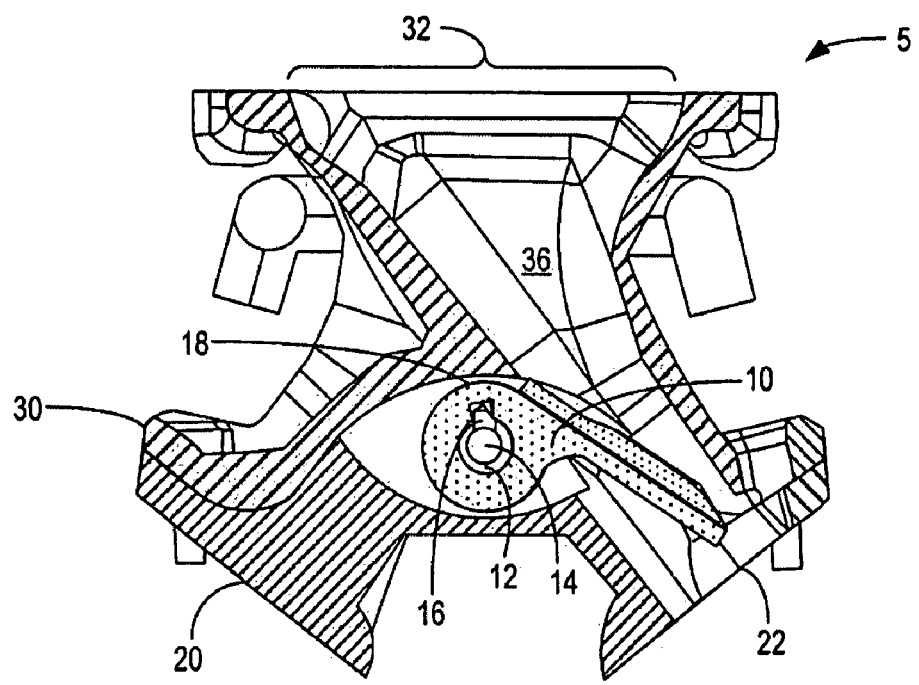
FIGS. 2a-2b illustrate cross-sectional perspective views of an engine intake manifold with a control valve restricting and allowing air flow according to an exemplary embodiment of the present invention.
Figure 2B:
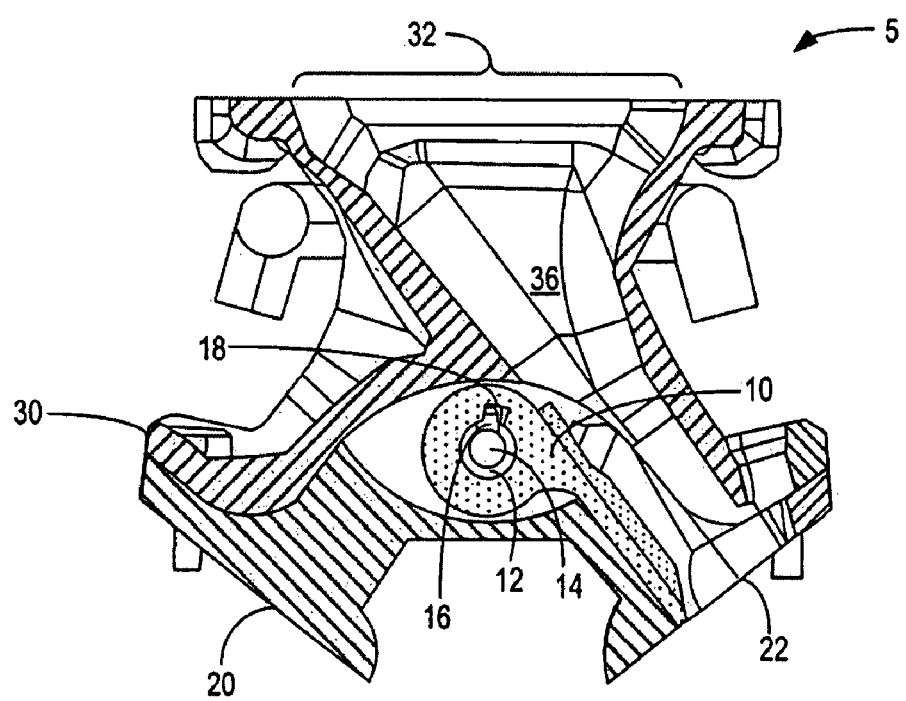

FIGS. 2a-2b illustrate cross-sectional perspective views of an engine intake manifold 5 with the control valve 10 restricting and allowing air flow, according to an exemplary embodiment of the present invention. In FIG. 2a, the center shaft 14 is engaged in a first position thereby causing the control valve 10 to restrict air flow in the port 36. Here, the control valve 10 is rotated to almost close the port opening 22 preventing a free flow of air in the port 36 from the port opening 32. In FIG. 2b, the center shaft 14 is engaged in a second position thereby causing the control valve 10 to allow unrestricted air flow in the port 36. Here, the control valve is rotated back to open the port 36 allowing air to flow unrestricted from the port opening 32 to the port opening 22.

As described herein, restricting the air flow increases the velocity of the air through the ports 36. The air flows from the port opening 32 and is constrained by the control valve 10 while the valve 10 is engaged causing velocity to increase through the port 36 to the port opening 22. Here, the combustion chamber (not shown) receives the increased velocity air from the port opening 22 at a higher speed causing tumble and swirl (also known as charge motion). Advantageously, this provides a modest increase in efficiency for the combustion rate, improving fuel economy, idle quality, and combustion stability. Also, the present invention provides a benefit because the center shaft 14, tube shaft 12, and control valves 10 are located outside of the primary air flow of port 36 thereby not interfering with the air flow when disengaged. Other designs place the shaft in the middle of the port creating a restriction of air flow that impacts performance at high RPM.

Figure 3A:
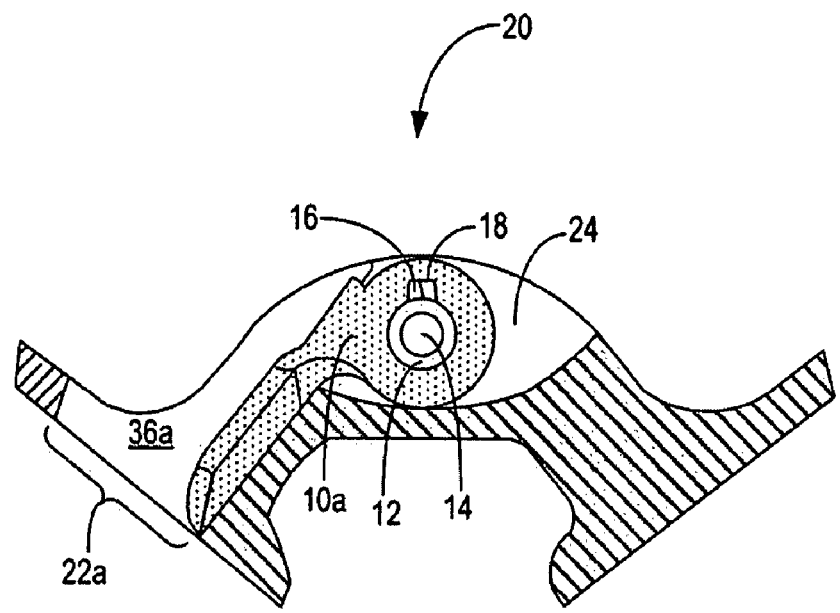
FIGS. 3a-3b illustrate front and side perspective views of the manifold lower housing equipped with control valves.
Figure 3B:
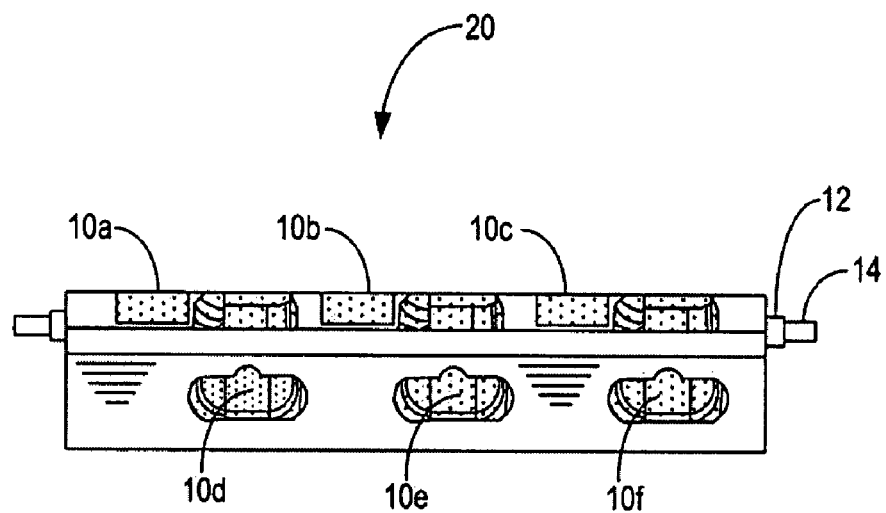

FIGS. 3a-3b illustrate front and side perspective views of the manifold lower housing 20 equipped with control valves 10. FIG. 3a illustrates a frontal perspective view of the manifold lower housing 20 with port 36a shown cut-through to illustrate the orientation of the control valve 10a. The control valve 10a engages the moveable center shaft 14 through the dowel pin 16. The port 36a is the actual port shape opening in the manifold lower housing 20 where the openings in the manifold upper housing 30 meet to form the entire port.

FIG. 3b illustrates a side perspective view of the manifold lower housing 20 in an exemplary embodiment for a V6-type engine with six control valves 10a-10f each engaged with the moveable center shaft 14 through dowel pins 16 (not shown). As described herein, the moveable center shaft 14 is configured to move linearly through the stationary tube shaft 12. Dowel pins 16 on the moveable center shaft 14 engage the angled cam groove (not shown) in each of the control valves 10a-10f to translate linear motion into rotational motion in each valve 10a-10f. The stationary tube shaft 12 can be secured to the manifold lower housing 20 to prevent movement in the shaft 12 as the control valves 10a-10f rotate.

Figure 11A:
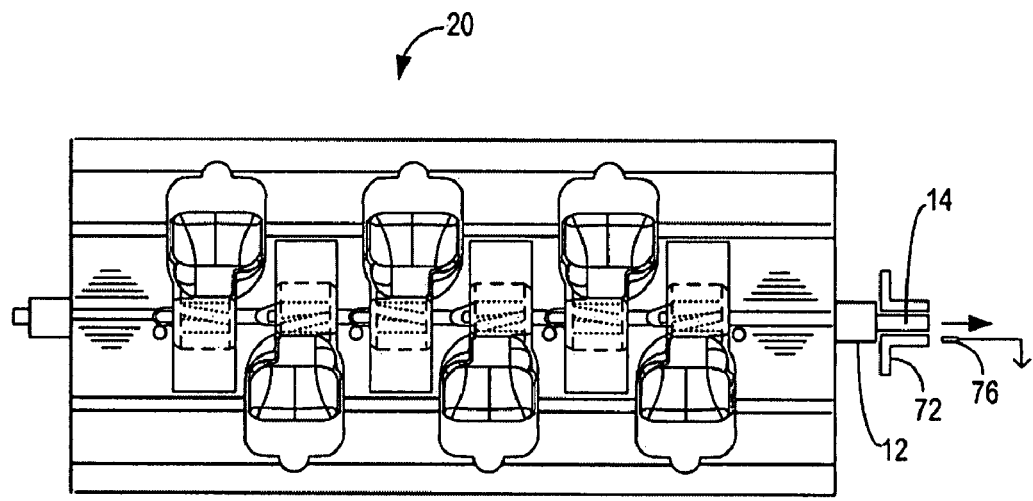
FIGS. 11a-11b illustrate the manifold lower housing including motors configured to actuate the moveable center shaft and sensor to sense the position of the control valves based on the position of the center shaft.
Figure 11B:
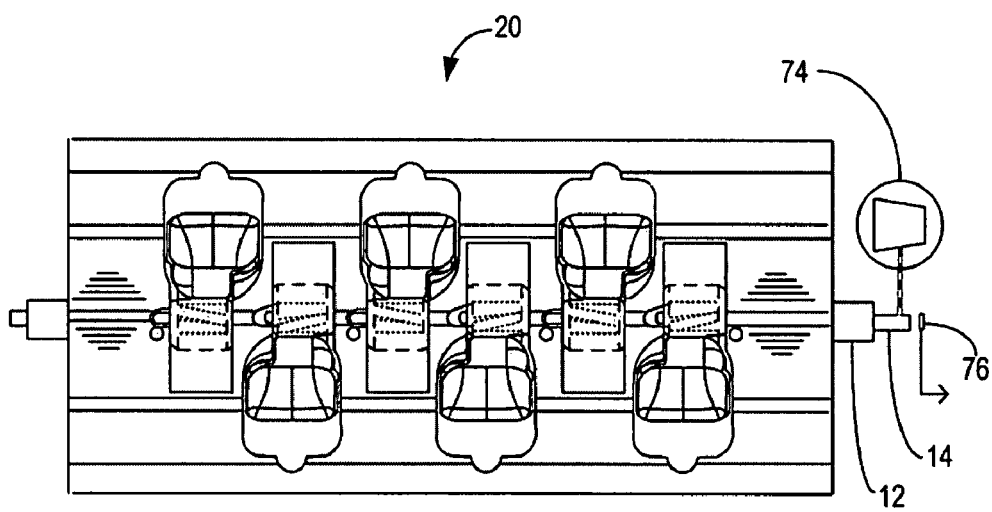

Advantageously, the moveable center shaft 14 operates valves 10a-10f for both sides of the manifold lower housing 20 without using gears or linkages which can suffer from performance degradation due to air gaps between linkages. Additionally, only one motor and sensor are required for all valves 10a-10f. The motor (as shown in FIGS. 11a-11b) is configured to move the center shaft 14 linearly and the sensor (as shown in FIGS. 11a-11b) is configured to sense the position of the valves 10a-10f based upon the location of the center shaft 14.

Figure 4A:
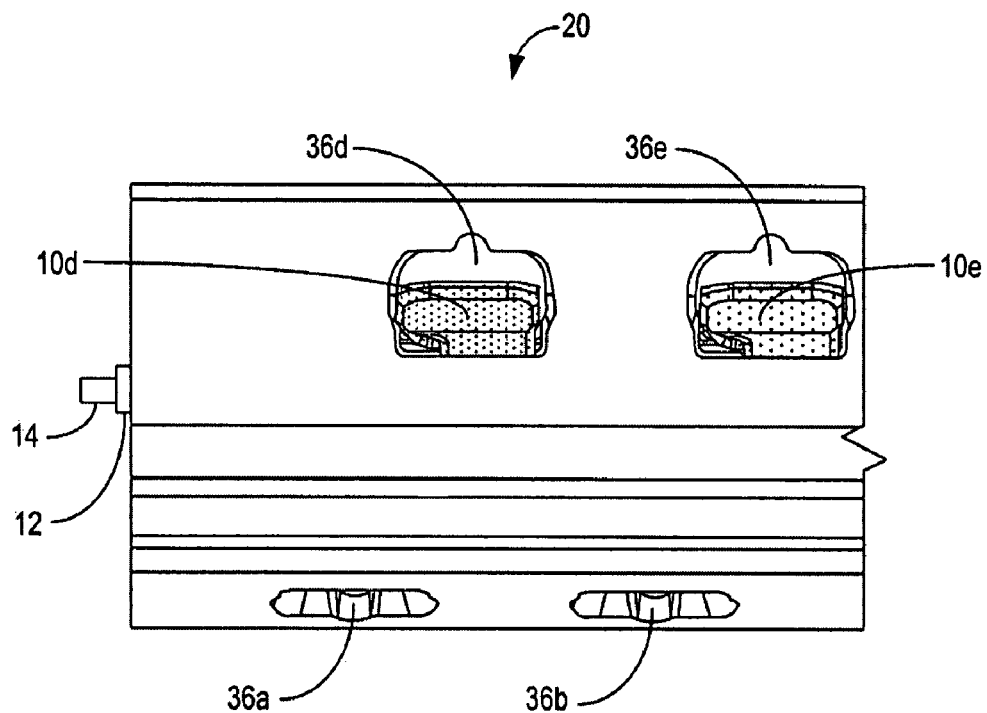
FIGS. 4a-4b illustrate bottom perspective views looking into the port opening of a portion of the manifold lower housing equipped with control valves restricting and allowing air flow according to an exemplary embodiment of the present invention.
Figure 4B:
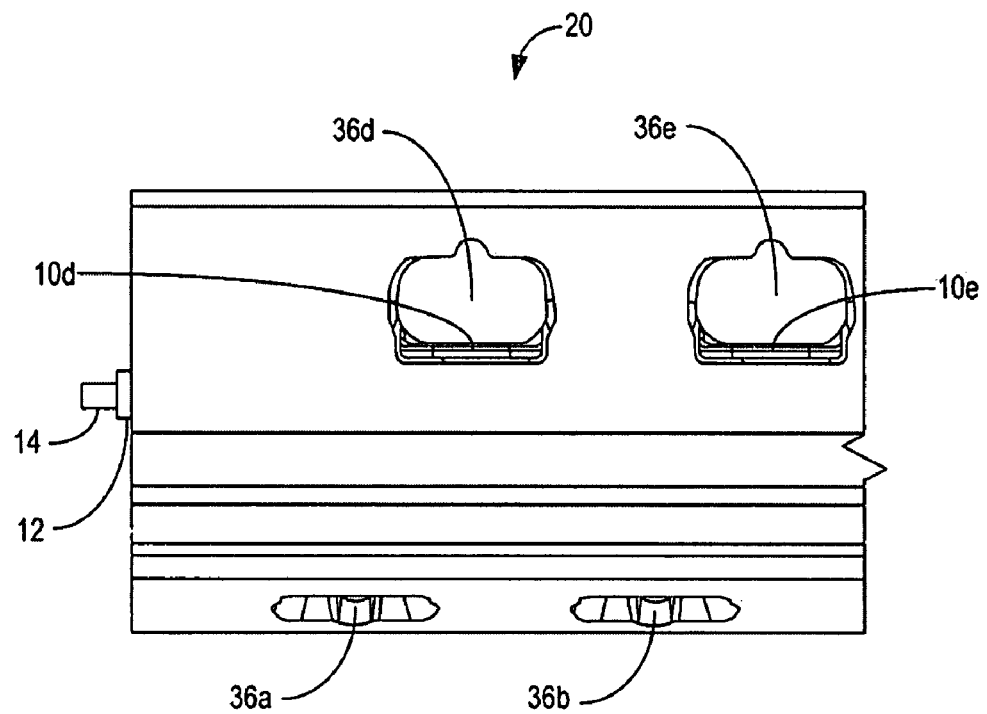

FIGS. 4a-4b illustrate bottom perspective views of a portion of the manifold lower housing 20 equipped with control valves 10d and 10e restricting and allowing air flow according to an exemplary embodiment of the present invention. In FIG. 4a, the control valves 10d and 10e are restricting air flow through ports 36d and 36e. Also, the control valves 10a and 10b (not shown) in port openings 36a and 36b are restricting air flow. Here, the moveable center shaft 14 is in a first position to activate the control valves 10a, 10b, 10d, and 10e. In FIG. 4b, the control valves 10d and 10e are open allowing air to flow freely in ports 36d and 36e. Also, the control valves 10a and 10b (not shown) in port openings 36a and 36b are allowing unrestricted air flow. The moveable center shaft 14 is in a second position to open the ports 36a, 36b, 36d, and 36e. A portion of each of the ports 36a, 36b, 36d, and 36e is cut away to allow the control valves 10a, 10b, 10d, and 10e to open and close within the ports.

Figure 5A:
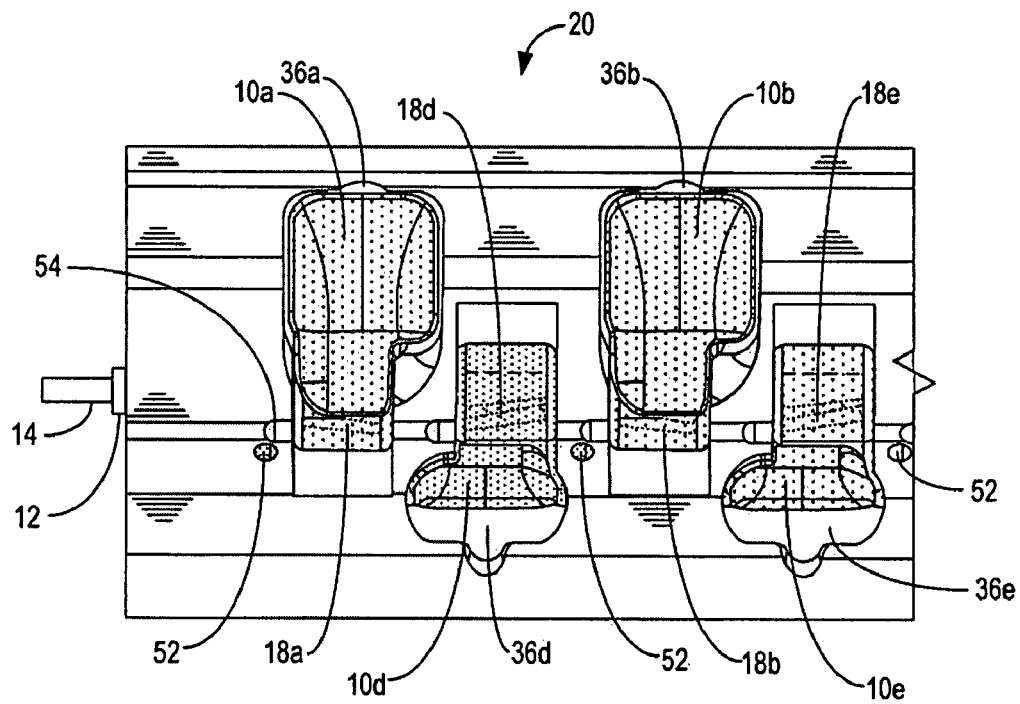
FIGS. 5a-5b illustrate top diagonal perspective views of a portion of the manifold lower housing equipped with control valves restricting and allowing air flow, and illustrating views of the base of the control valves to show the angled cam grooves.
Figure 5B:
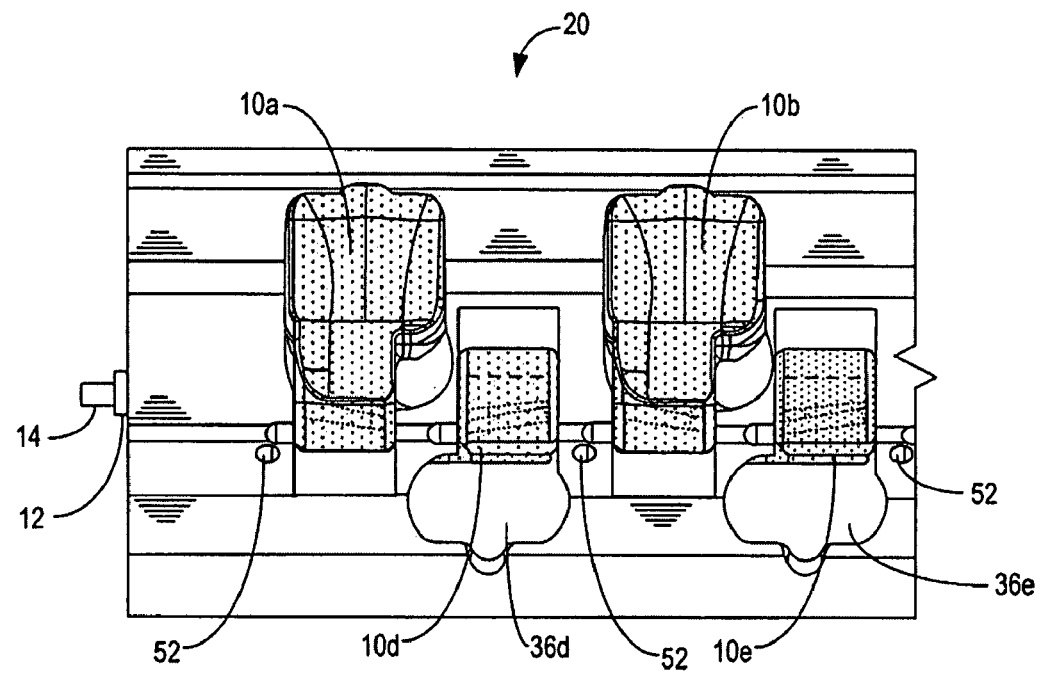

FIGS. 5a-5b illustrate top diagonal perspective views of a portion of the manifold lower housing 20 equipped with control valves 10a, 10b, 10d, and 10e restricting and allowing air flow, and illustrating views of the base of the control valves 10a, 10b, 10d, and 10e to show the angled cam grooves 18a, 18b, 18d, and 18e. Angled cam grooves 18a, 18b, 18d, and 18e are oriented to slant away from the face of the control valve 10. This orientation allows linear movement by the center shaft 14 to cause the dowel pins to engage the angled cam grooves 18a, 18b, 18d, and 18e in the base of the control valves 10a, 10b, 10d, and 10e to rotate the valves 10a, 10b, 10d, and 10e.

FIG. 5a illustrates a top diagonal view looking at the control valves 10a and 10b while they are engaged to restrict airflow, and control valves 10d and 10e are in the background to restrict airflow as well in ports 36d and 36e. FIG. 5b illustrates the same view with control valves 10a and 10b not engaged resting against the inside wall of the manifold lower housing 20 allowing air to freely flow. Also, control valves 10d and 10e are not engaged allowing free air flow through ports 36d and 36e.

The top of the manifold lower housing 20 includes roll pin holes 52 which can support a pressed fit roll pin in the manifold lower housing 20 operable to secure the tube shaft 12 in place to prevent the tube shaft 12 from pivoting while the valves 10a, 10b, 10d, and 10e engage and disengage. Only one roll pin hole 52 is required to secure the tube shaft 12, but additional roll pin holes 52 prevent twisting and corkscrewing of the tube shaft 12. Also, the top of the manifold lower housing 20 includes slots 54 which can be used to insert the dowel pins into the moveable center shaft 14 once the tube shaft 12 slides through opening 64 in the control valve 10, and the tube shaft 12 is correctly positioned in the manifold lower housing 20.

Figure 6:
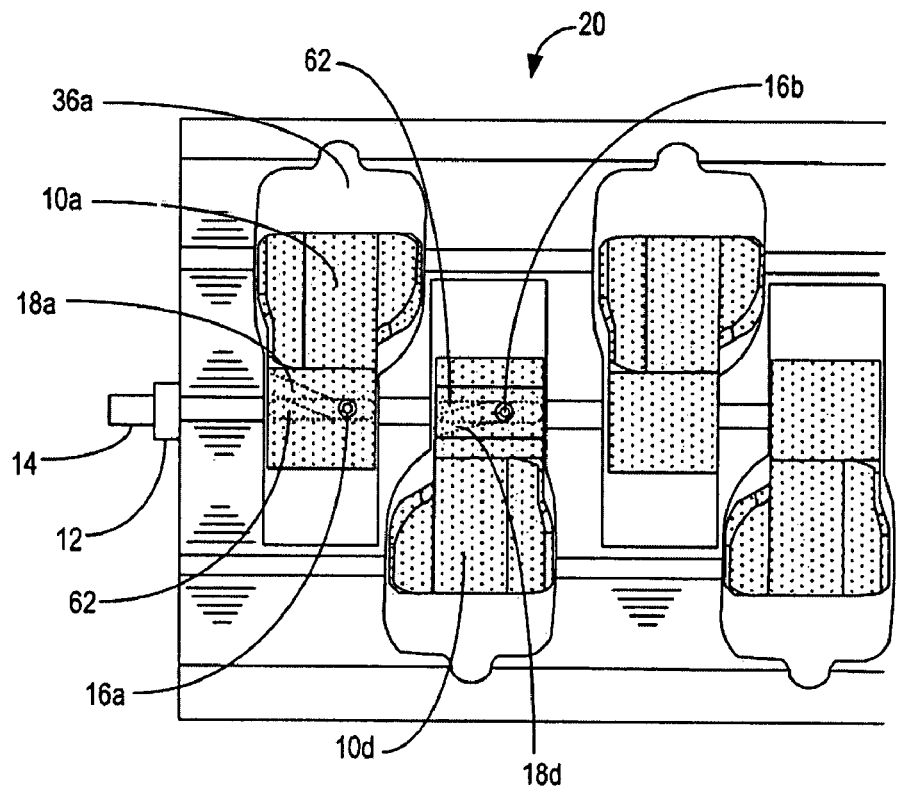
FIG. 6 illustrates a top view of control valves showing dowel pins engaged in angled cam grooves.

FIG. 6 illustrates a top view of the base of control valves 10a and 10b showing dowel pins 16a and 16b engaged in angled cam grooves 18a and 18b. The dowel pins 16a and 16b are attached to the moveable center shaft 14. The moveable center shaft 14 fits into the stationary tube shaft 12. The tube shaft 12 includes a slot 62 through which the dowel pins 16a and 16b fit and slide linearly while engaging the angled cam grooves 18a and 18b.

Figure 7:
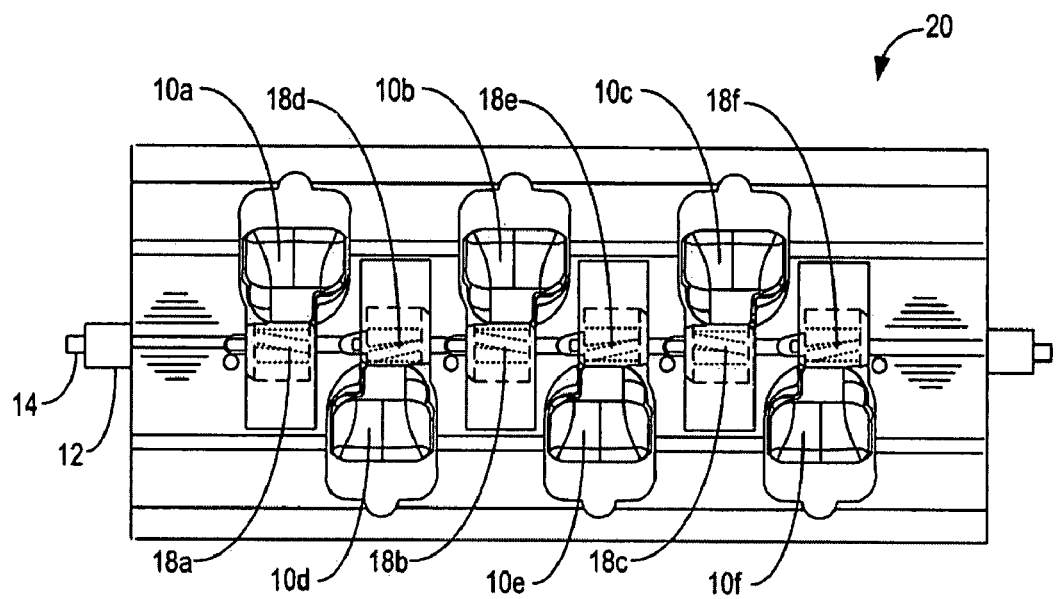
FIG. 7 illustrates a top view of the manifold lower housing with six control valves for a V6 engine according to an exemplary embodiment of the present invention.

FIG. 7 illustrates a top view of the manifold lower housing 20 with six control valves 10a-10f for a V6 engine according to an exemplary embodiment of the present invention. As described herein, the tube shaft 12 is stationary and houses the moveable center shaft 14 which includes one dowel pin for each control valve 10a-10f. The dowel pins engage the control valves 10a-10f along the angled cam grooves 18a-18f such that linear motion of the moveable center shaft 14 engages and disengages all six control valves 10a-10f. Additionally, the present invention can be utilized on other engines such as, for example, V4, V8, in-line, or the like.

Figure 8A:
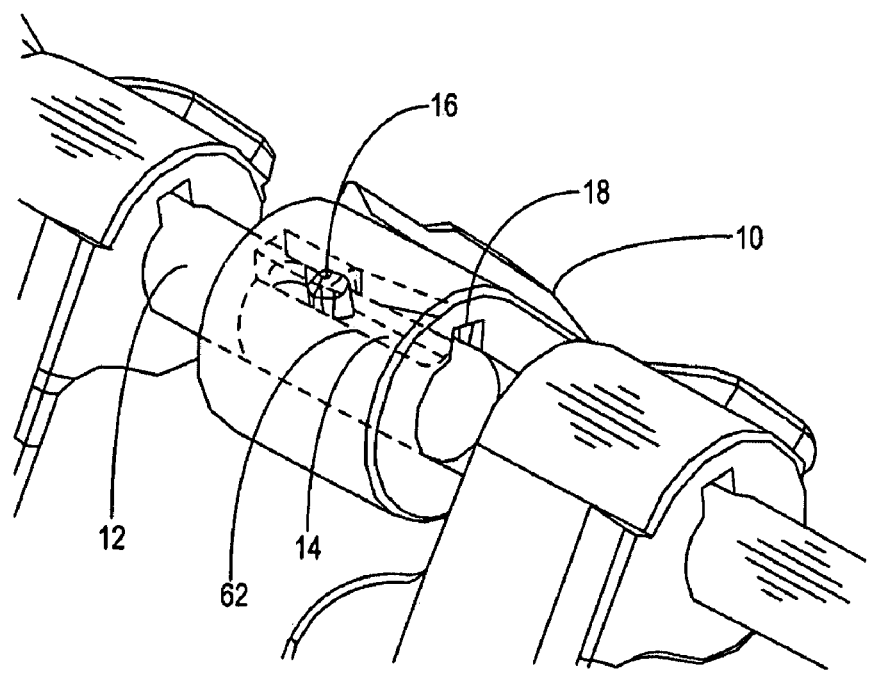
FIGS. 8a-8b illustrate perspective views of the stationary tube shaft with bases of control valves encompassing the tube shaft with the control valves inside the manifold lower housing.
Figure 8B:
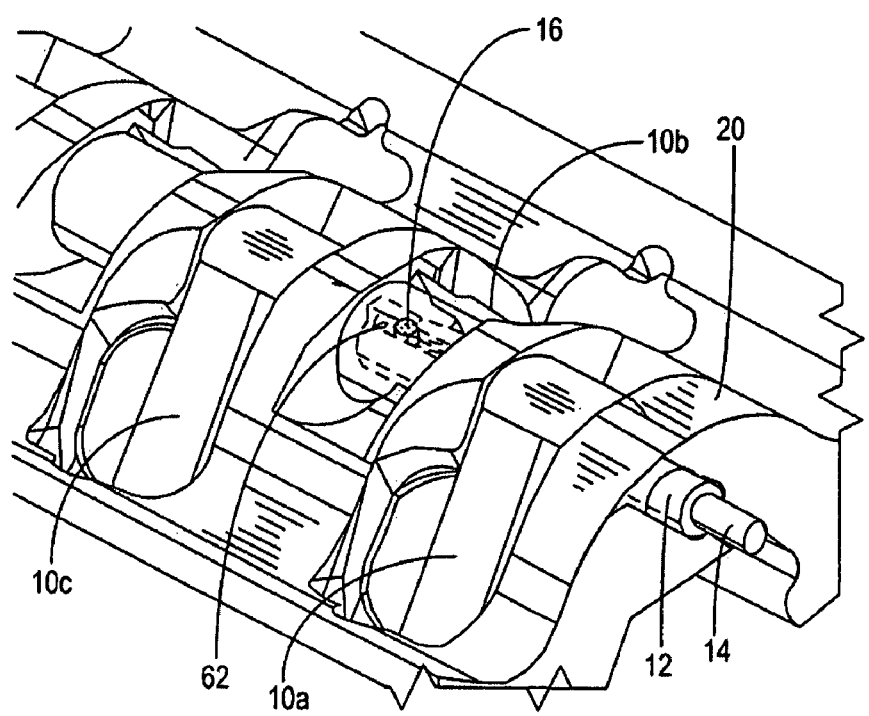

FIGS. 8a-8b illustrate perspective views of the stationary tube shaft 12 with bases of control valves 10 encompassing the tube shaft 12 with the control valves 10 inside the manifold lower housing 20. FIG. 8a illustrates a view of the base of one control valve 10 showing how the dowel pin 16 engages the angled cam groove 18. As described herein, the tube shaft 12 includes the moveable center shaft 14 inside the hollow tube of the tube shaft 12. The slot 62 of the tube shaft 12 is a rectangular shaped opening through which the dowel pin 16 engages the angled cam groove 18 of the control valve 10. The dowel pin 16 is physically attached to the moveable center shaft 14 and is configured to move linearly along the slot 62 as the moveable center shaft 14 moves linearly. This motion causes the dowel pin 16 to engage the angled cam groove 18 activating a rotation about the base of the control valve 10 causing the control valve to engage or disengage. Each adjacent control valve 10 is oriented in the opposite direction due to valve location on the manifold lower housing 20. The control valves 10 can be oriented in any direction as required for the port locations with the angled cam grooves 18 oriented appropriately to engage and disengage the valves 10 based on the linear motion of the center shaft 14.

FIG. 8b illustrates the same diagram as FIG. 8a with the manifold lower housing 20 shown with the tube shaft 12 located inside the manifold lower housing 20. As described herein, the tube shaft 12 is secured to the manifold lower housing 20 to stay stationary while the center shaft 14 is moved linearly to engage and disengage the control valves 10. A motor or the like can be placed at the end of the manifold lower housing 20 attached to the center shaft 14 to activate all control valves 10.

Figure 9A:
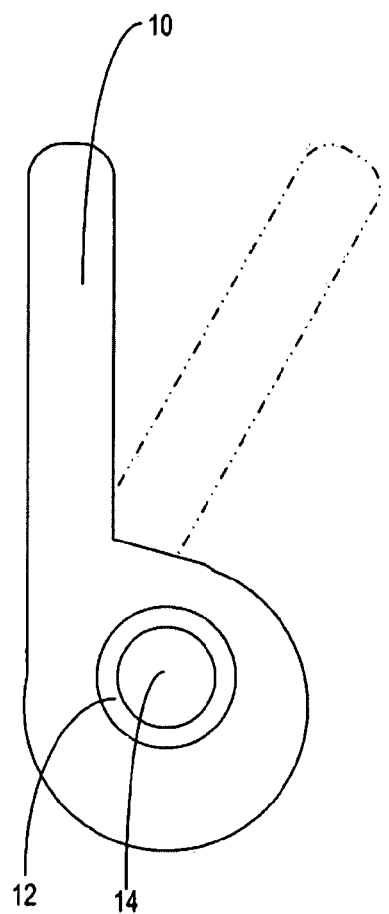
FIGS. 9a-9b illustrate isolated perspective views of the base of the control valve and a side view of the control valve showing the relative position of the control valve engaged and disengaged.
Figure 9B:
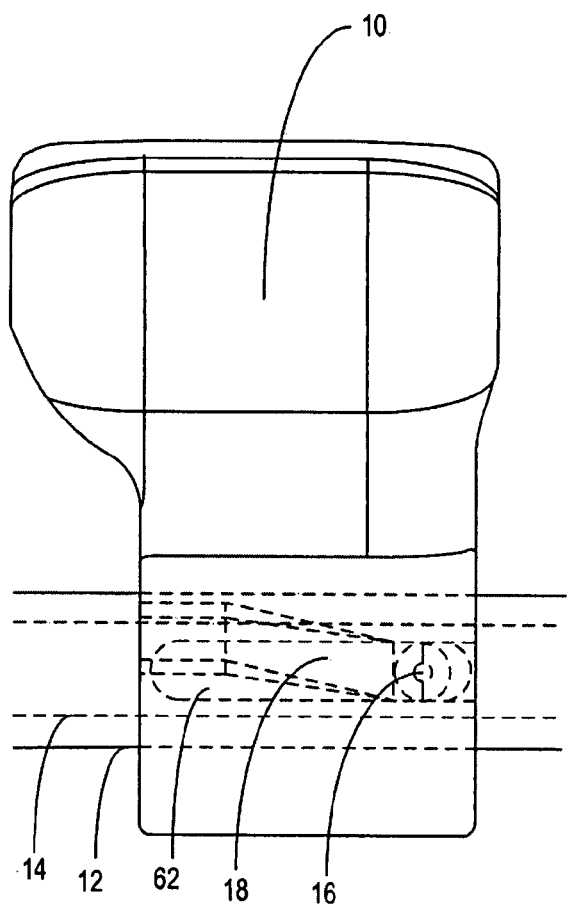

FIGS. 9a-9b illustrate perspective views of the base of the control valve 10 and a side view of the control valve 10 showing the relative position of the control valve 10 engaged and disengaged. As described herein, the tube shaft 12 is stationary and the movable center shaft 14 is located within the tube shaft 12. The dowel pin 16 engages the angled cam groove 18 of the control valve 10 through the slot 62 in the tube shaft 12, and the dowel pin 16 is fixed to the center shaft 14. The angled cam groove 18 is positioned such that the dowel pin 16 engages the control valve 10 thereby rotating the valve 10. For example, the cam groove 18 is angled with radii at sharp edges allowing the dowel pin 16 to slide through the groove 18.

Linear motion by the center shaft 14 causes the dowel pin 16 to engage and disengage the control valve 10 as shown in FIGS. 9a-9b. With the dowel pin 16 located on the right end of the slot 62 of the tube shaft 12, the control valve 10 is in a first position as shown in FIG. 9a. As the dowel pin 16 engages the angled cam groove 18 of the control valve 10 by moving the center shaft 14 towards the left, the control valve 10 rotates to a second position as shown by the dotted line in FIG. 9a.

Figure 10A:
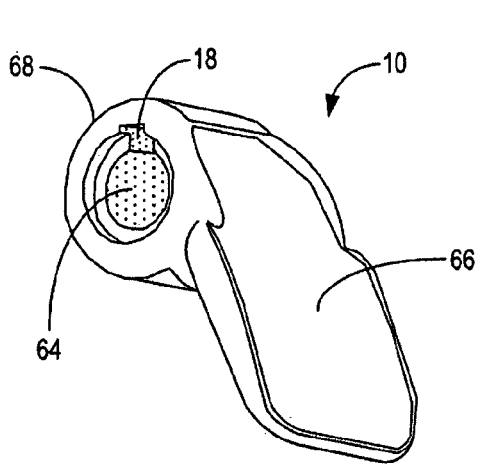
FIGS. 10a-10c illustrate perspective views of exemplary embodiments of control valves.
Figure 10B:
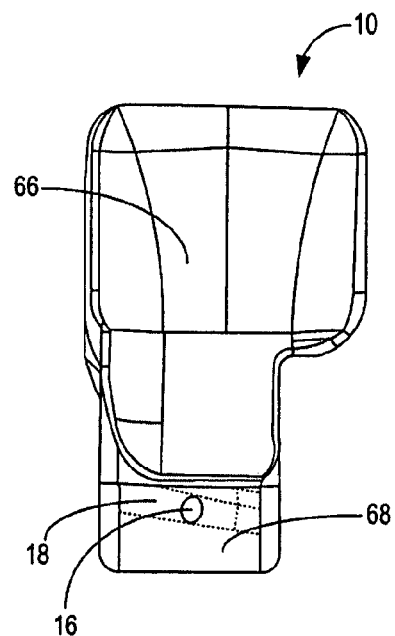
Figure 10C:
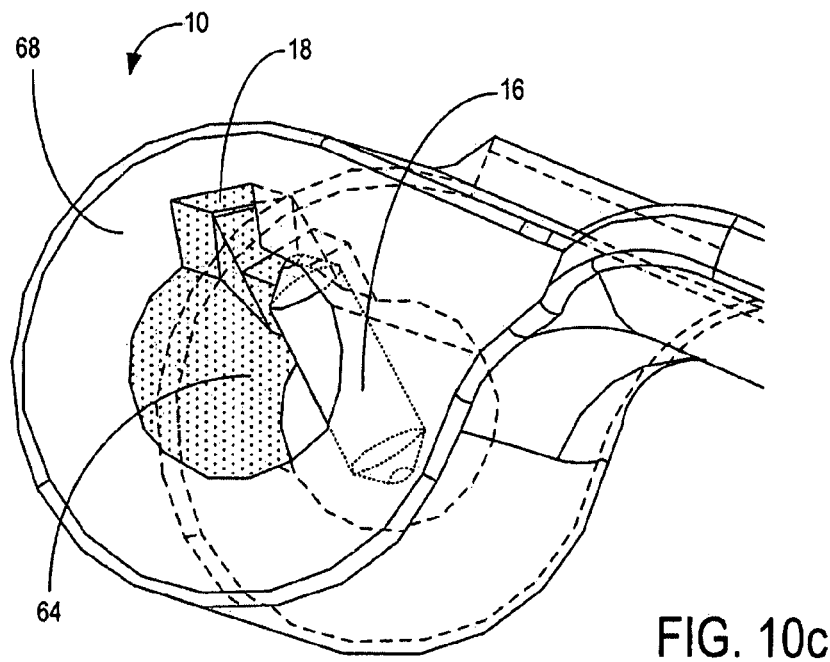

FIGS. 10a-10c illustrate perspective views of exemplary embodiments of control valves 10. The control valve 10 includes a base 68 with a circular base opening 64 and a flap 66 attached to the base 68. The control valve 10 can be a single molded plastic piece, an aluminum die cast, or other metals as well with the base 68 and the flap 66 physically attached as a single unit or integrally formed. The circular base opening 64 is sized to fit the tube shaft 12 through it, lining up the slot 62 of the tube shaft 12 with the angled cam groove 18 in the base 68. The dowel pin 16 is configured to engage the base 68 of the control valve 10 through the angled cam groove 18.

FIGS. 11a-11b illustrate the manifold lower housing 20 including motors 72 and 74 configured to actuate the moveable center shaft 14 and sensors 76 to sense the position of the control valves based on the position of the center shaft 14. FIG. 11a illustrates a linear induction motor 72 configured on one end of the manifold lower housing 20 and coupled to the center shaft 14. The linear induction motor 72 is configured to linearly move the center shaft 14 thereby activating the control valves 10 by engaging the dowel pins 16 connected to the center shaft 14 through the angled cam grooves 18 in the base of each valve 10. The motor 72 can be located on either side of the manifold lower housing 20, and for illustration purposes is shown on the right side in FIGS. 11a and 11b. FIG. 11b illustrates a rotating motor 74 with an arm connected to the center shaft 14 to translate rotating motion in the motor 74 into linear motion in the center shaft 14. Additionally, sensors 76 such as Hall Effect sensors or the like can be located at either end or along the center shaft 14 to sense multiple positions. Advantageously, the present invention only requires one sensor to determine the first and second position of the center shaft 14.

Figure 12:
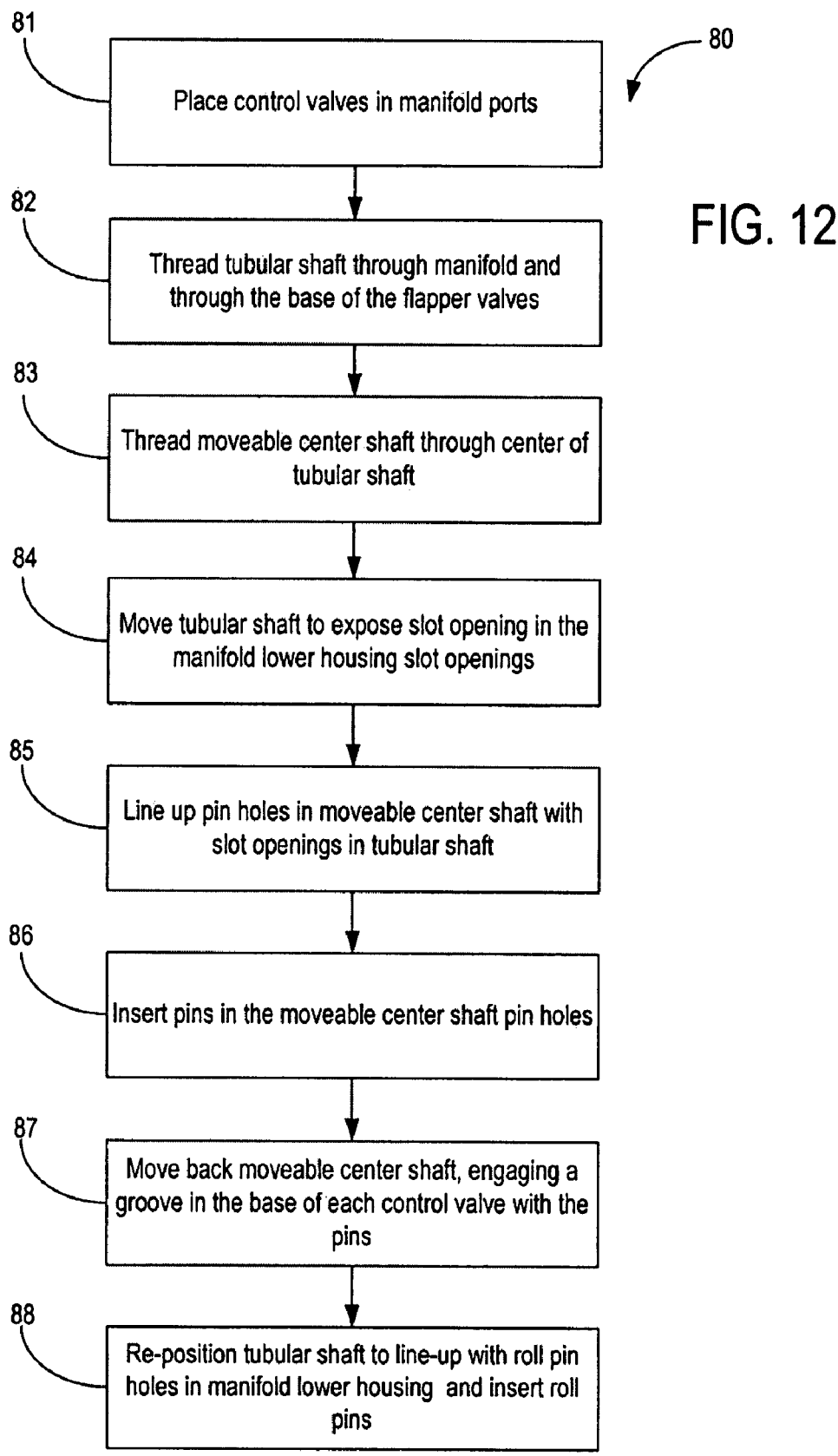
FIG. 12 illustrates an exemplary method for assembling an air induction system of the present invention.

FIG. 12 illustrates an exemplary assembly method 80 for assembling an air induction system of the present invention. Advantageously, the present invention is assembled without attaching the control valves with screws, thus eliminating a problem with tolerance stack-up at assembly. Further, the present invention can be manufactured with metals or plastics or any combination as necessary. The exemplary assembly method 80 starts by placing control valves in the intake ports of a manifold lower housing, as depicted in step 81. One control valve is place in each port such that the opening in the base of the control valve lines up with an opening in the manifold lower housing, for the shafts. For example, there can be 4, 6, or 8 ports for a V4, V6, or V8 respectively. Next, a tube shaft is threaded through the manifold lower housing, and through the openings in the base of the control valves, as depicted in step 82.

A moveable center shaft is threaded through the center of the tube shaft, as depicted in step 83. As discussed herein, the tube shaft includes a hollow center sized to fit the moveable center shaft. Next, the tube shaft is moved to expose its slot openings in the manifold lower housing slot openings, as depicted in step 84. The manifold lower housing can include a small slot opening outside the port which can be used to expose the slot opening in the tube shaft. The pin holes in the moveable shaft are lined up with the slot openings in the tube shaft and slot openings in the manifold lower housing, as depicted in step 85. This is done by rotating and sliding the moveable center shaft as required to line up the pin holes through the exposed slot openings in the manifold lower housing, and the tube shaft. Pins are inserted in the pin holes of the moveable center shaft, as depicted in step 86. For example, the pins can include dowel pins.

The moveable center shaft is moved back, engaging a groove in the base of each control valve with the pins, as depicted in step 87. Here, the pin is positioned in the groove (e.g., angled cam groove) in the base of the control valves. Once engaged, the pin translates linear motion from the moveable center shaft to rotational motion in the control valve through the groove. Finally, the tube shaft is re-positioned to line-up with the roll pin holes in the manifold lower housing and roll pins are inserted, as depicted in step 88.

Although the present invention has been illustrated and described herein with reference to preferred embodiments and specific examples thereof, it will be readily apparent to those of ordinary skill in the art that other embodiments land examples may perform similar functions and/or achieve like results. All such equivalent embodiments and examples are within the spirit and scope of the present invention and are intended to be covered by the following claims.

What is claimed is:

1. An air induction method utilizing a single shaft and sensor to activate all air control valves, the method comprising the steps of:
   selectively moving a moveable center shaft to a first position to engage a plurality of control valves to restrict air flow through intake ports of an intake manifold; and
   selectively moving the moveable center shaft to a second position to disengage the plurality of control valves to allow air flow through intake ports of the intake manifold;
   wherein the moveable center shaft is configured to engage an angled cam groove in the base of each of the plurality of control valves with a dowel pin, and wherein the angled cam groove comprises radii at sharp edges operable to translate linear motion of the moveable center shaft to engage and disengage the plurality of control valves.

2. The air induction method of claim 1, wherein the moveable center shaft is configured to engage and disengage the plurality of control valves on both sides of a 'V'-type engine intake manifold.

3. An assembly method for an air induction system utilizing a single shaft and sensor to activate all air control valves, the method comprising the steps of:
   placing a plurality of control valves in ports in a manifold lower housing;
   threading a tube shaft through an opening in the manifold lower housing and through the bases of the plurality of control valves;
   threading a moveable center shaft through the center of the tube shaft;
   moving the tube shaft to expose slot openings of the tube shaft in slot openings of the manifold lower housing;
   lining up pin holes in the moveable center shaft with the slot openings in the tube shaft;
   inserting pins in the pin holes in the moveable center shaft;
   moving the moveable center shaft back to engage a groove in the base of each of the plurality of control valves with the pins;
   re-positioning tube shaft to line up with holes in the manifold lower housing; and
   inserting roll pins in the holes in the manifold lower housing.

\* \* \* \* \*